United States Patent [19]
Chen

[11] 3,827,221
[45] Aug. 6, 1974

[54] ORANGE PICKER
[75] Inventor: Pictiaw Chen, Davis, Calif.
[73] Assignee: The Regents of the University of California, Berkeley, Calif.
[22] Filed: May 4, 1973
[21] Appl. No.: 357,486

[52] U.S. Cl. ............................................. 56/328 R
[51] Int. Cl. ............................................. A01g 19/08
[58] Field of Search .................................. 56/328 R

[56] References Cited
UNITED STATES PATENTS
3,380,235   4/1968   Smith et al. ..................... 56/328 R
3,417,558   12/1968   Granger ......................... 56/328 R

*Primary Examiner*—Russell R. Kinsey
*Attorney, Agent, or Firm*—Lothrop & West

[57] ABSTRACT

An orange picker, particularly for use in a grove of orange trees, includes a portable carriage having a movable frame thereon. An arm is movable to and fro on the frame toward and away from an orange tree and is effective to penetrate into the interior of the tree. On the arm is a hook, preferably flexible, having a base portion secured to the arm and an outstanding terminal portion spaced from the arm. The hook is normally C-shaped and is resilient. In operation, the arm with the terminal hook withdrawn is thrust into the tree. The hook is projected from the arm and is then withdrawn. The hook is large enough to pass over, without effect, any small, immature oranges, is flexible enough to be deflected without harm by tree branches and the like and is small and strong enough to engage with an orange of a size to be picked. The inner edge of the hook interengages with the stem of a large orange and severs the stem or pulls the orange therefrom. The orange then falls into a suitable receiver.

6 Claims, 24 Drawing Figures

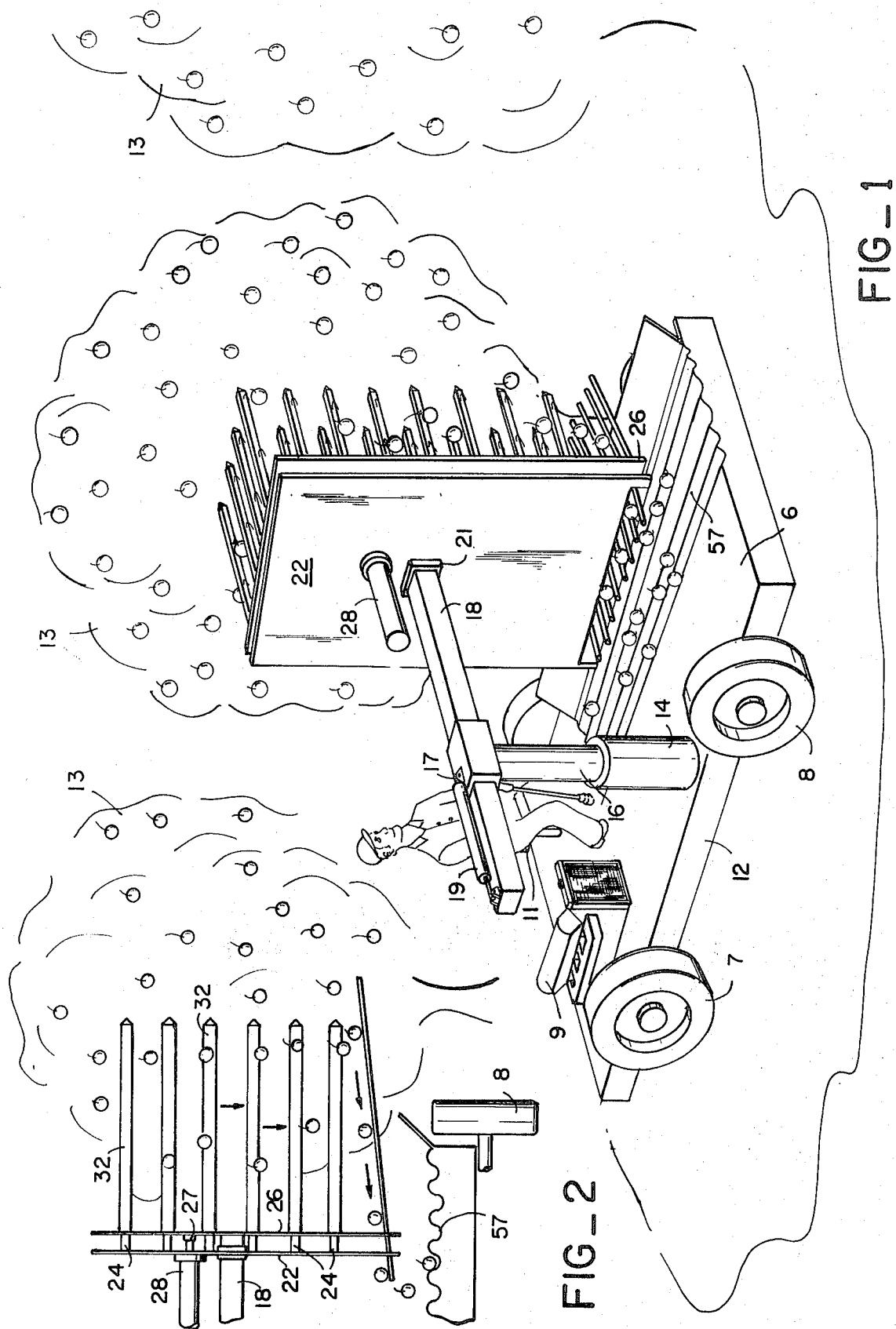

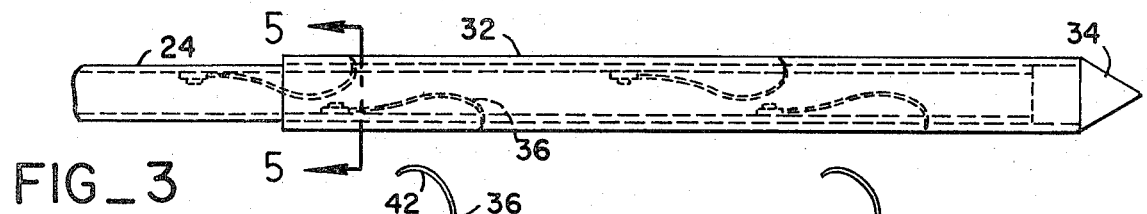
FIG_3
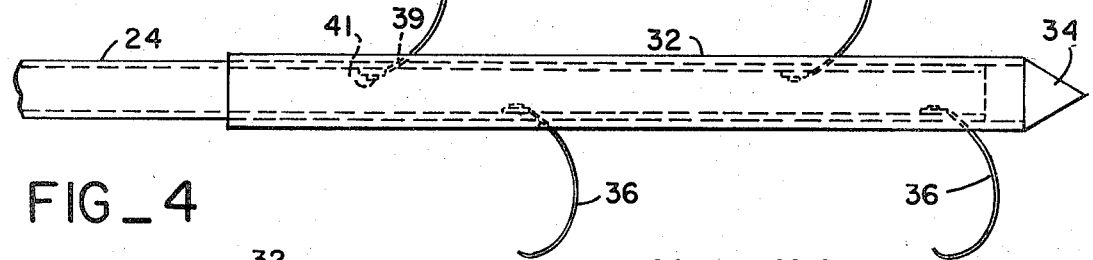
FIG_4
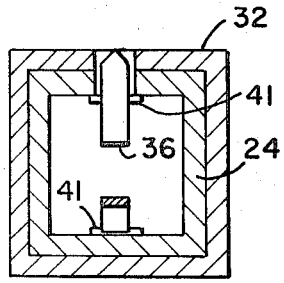
FIG_5
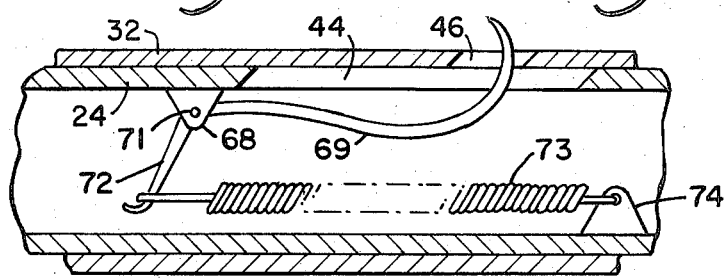
FIG_6
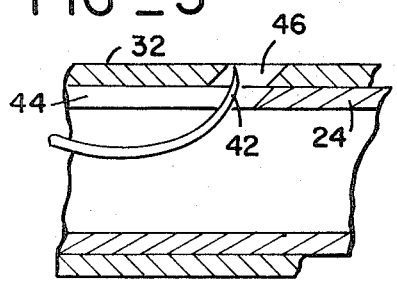
FIG_7
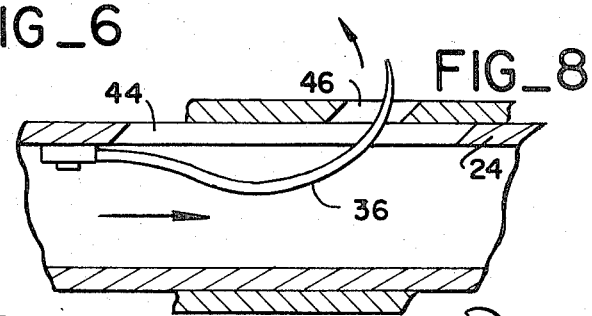
FIG_8
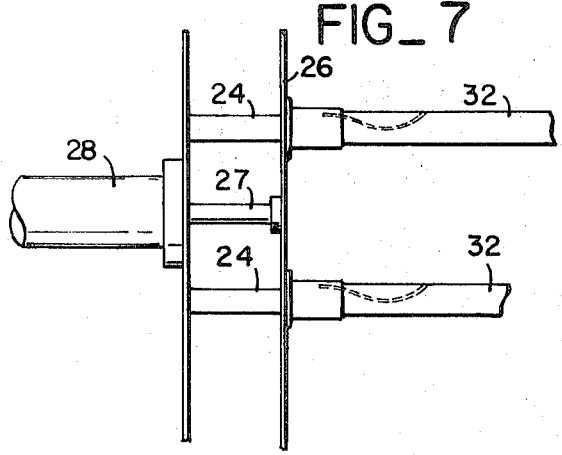
FIG_9
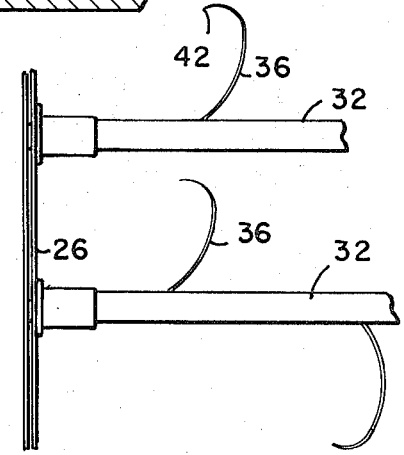
FIG_10

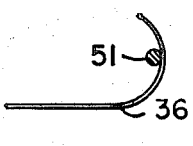 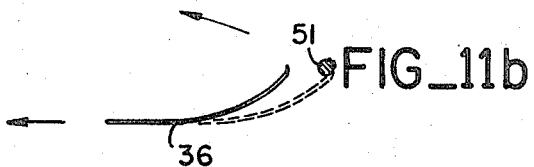
FIG_11a  FIG_11b
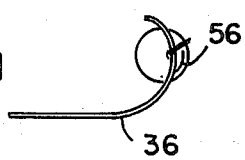 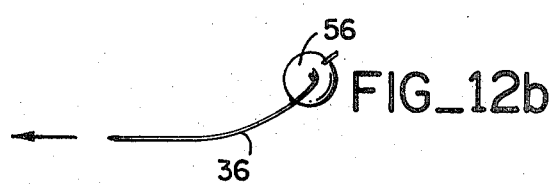
FIG_12a  FIG_12b
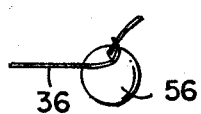 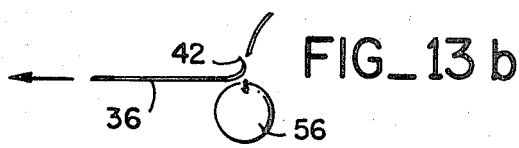
FIG_13a  FIG_13b
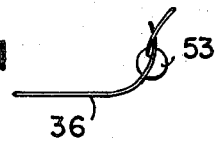 
FIG_14a  FIG_14b
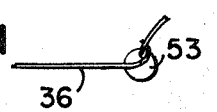 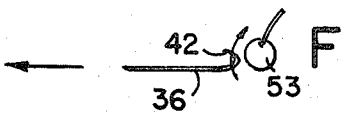
FIG_15a  FIG_15b
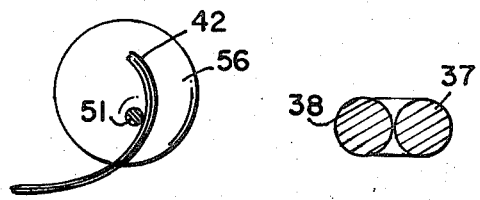
FIG_16  FIG_17
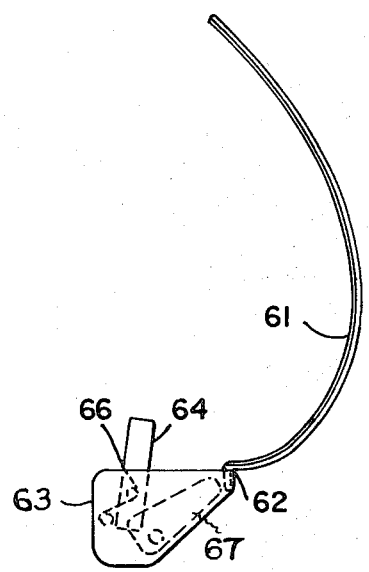 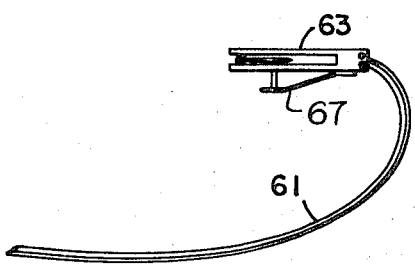
FIG_18  FIG_19

ORANGE PICKER

The manual harvesting of many fruits has been largely superseded in many areas by mechanical pickers. For some items these are quite effective but for others have not worked well at all. The nature of orange trees and their character of growth, navels as well as Valencias, makes mechanical picking difficult. The relatively dense, stiff growth of the tree and its branches impedes access to and subsequent falling of dislodged fruit and makes it difficult to get to much of the fruit to engage it for picking. The fruit is distributed in part on the exterior of the tree but much of it is well within the interior of the tree. There is a difficulty with some proposed automatic picking devices in that they cannot select fruit that is ripe or large enough to be picked and leave other fruit on the tree for additional sizing and maturing. Some other, proposed devices are relatively delicate and tend to sustain substantial injury after relatively short use and some devices injure the fruit and the tree. Furthermore, many proposed automatic picking devices are complex and require fine adjustments. While they may work reasonably well under some conditions, they do not readily accommodate a wide variety of picking conditions.

It is therefore an object of the invention to provide an orange picker that is rugged and simple.

Another object of the invention is to provide an orange picker which not only is effective to detach fruit from the tree but likewise has a selecting ability between small, immature fruit and large, mature fruit.

Another object of the invention is to provide an orange picker in which injury to the tree by use of the picker is minimized.

A further object of the invention is to provide an orange picker that can quite readily be utilized as a portable device in an orange grove and which can pick much of the fruit from one or only a few machine locations.

A further object of the invention is to provide an orange picker which releases the fruit from the tree in such a way that the fruit can collect in a catching device without substantial fruit injury.

A further object of the invention is to provide an orange picker that is a substantial improvement over picking machines, particularly orange picking machines, heretofore known.

Other objects of the invention, together with the foregoing, are attained in the embodiments of the invention described in the accompanying description and illustrated in the accompanying drawings, in which:

FIG. 1 is a perspective view, partly diagrammatic, of an orange picker constructed pursuant to the invention;

FIG. 2 is an end elevation of a portion of the orange picker;

FIG. 3 is a side elevation of part of a typical picking mechanism in retracted position;

FIG. 4 is a view comparable to FIG. 3 but showing the parts in an extended position;

FIG. 5 is a cross-section, the plane of which is indicated by the line 5—5 of FIG. 3;

FIG. 6 is a cross-section showing a modified form of hook construction;

FIG. 7 is an enlarged, longitudinal cross-section showing one position of a typical hook;

FIG. 8 is a view comparable to FIG. 7 but showing a typical hook in a different position;

FIG. 9 is a fragmentary view showing a portion of a picking array with the hooks in retracted position;

FIG. 10 is a view comparable to FIG. 9 but showing the parts in position with the hooks extended;

FIG. 11a is a view of a hook encountering a tree branch, shown in cross-section;

FIG. 11b is a view similar to FIG. 11a but showing the hook in an extended, disengaging condition;

FIG. 12a is a plan view of a relaxed hook engaging the stem of a relatively large, mature orange;

FIG. 12b shows in plan the hook extended and just after severing the orange stem in picking the orange;

FIG. 13a is a side elevation of the hook action shown in FIG. 12a;

FIG. 13b is a side view of the operation shown in FIG. 13a;

FIG. 14a is a top view of a hook encountering a relatively small, immature orange stem;

FIG. 14b is a top view comparable to FIG. 14a but shortly subsequent thereto;

FIG. 15a is a side elevation of the relationship of FIG. 14a;

FIG. 15b is a side elevation of the relationship in FIG. 14b;

FIG. 16 is an enlarged detail showing the construction of the hook in engagement with a fruit stem, the stem being in cross-section;

FIG. 17 is a cross-section through the shank of a typical hook;

FIG. 18 is a fragmentary plan of a modified form of a hook with a cutting blade attached thereto; and FIG. 19 is a companion view to FIG. 18 and shows the hook and blade construction in side elevation of the blade.

While the orange picker pursuant to the invention can be embodied in a widely variant number of ways, it has with success been embodied substantially as shown herein. In this form of the device there is preferably provided a mobile vehicle 6 or carriage having wheel supports 7 and 8 and having a driving engine 9 thereon as well as a station 11 for an operator. The carriage 6 is inclusive of a frame 12 and is adapted to be operated by the operator between trees 13 planted in the customary way in succession to each other in rows in a grove. Each of the trees is spaced from other trees so as to allow some aisle space between them, at least enough so that the vehicle or carriage 6 can be driven along the row alongside each of the trees.

Pursuant to the invention there is mounted on the carriage 6 an upright cylinder 14 with which a plunger 16 telescopes. The plunger is usually hydraulically operated, under the control of the machine operator, so that the plunger 16 can be set at any selected height and can be moved vertically at will. Furthermore, since the plunger 16 and the upright cylinder 14 are circular they can be relatively rotated, if desired. Customarily, they are substantially locked, at least temporarily, in one relative position.

Crowning the plunger 16 is a guide box 17 extending generally horizontally and within which a frame beam 18 is horizontally slidable throughout a substantial distance. Conveniently, a hydraulic cylinder mechanism 19 interconnects the box 17 and the beam in order to translate the beam through the box 17 under the control of the machine operator. The beam travel is equal to about half the diameter of the tree. At one end the beam 18 is provided with a mounting plate 21 secured to a rectangular frame plate 22 of substantial extent, preferably ranging from a low point near the bottom portion of the orange tree to a high point close to the top thereof and having a width which is a substantial fraction of the width or diameter of the tree 13.

Arranged in a predetermined array or pattern on the plate 22 is a plurality of similar arms 24 (FIGS. 3, 4 and 5). Conveniently, these are of rectangular or cylindrical tubing and are fastened at their bases firmly to the frame plate 22. They are conveniently arranged in vertical rows as well as horizontal files, usually spaced equally with respect to each other. The length of the arm is a substantial fraction of the diameter of the orange tree, for example, about one-half or more thereof.

Each of the arms passes through an appropriate rectangular opening in a movable frame plate 26. Near the center, the plate 26 is connected firmly to the piston rod 27 of a hydraulic cylinder 28 at its base mounted on the frame plate 22. With this arrangement, the plate 26 is appropriately supported for movement by rectilinear translation and in a generally horizontal direction with respect to the frame plate 22 by operator-controlled reciprocation of the piston of the hydraulic jack 28.

Firmly mounted at their bases on the plate 26 are guards 32 of generally tubular form designed to telescope easily with the arms 24, the guards themselves being arranged on the plate 26 in substantially the same predetermined array as are the arms. The guards 32 are somewhat longer than the arms so that the arms are substantially housed despite the relative reciprocating movement of the guards and arms. The guards conveniently have closed, pointed tips 34 thereon.

Mounted at appropriate intervals on each one of the arms, and a description of one is intended to apply to all, are hooks 36 conveniently of flexible, elastic material, such as spring steel, and, when unstressed, having a contour substantially as shown in FIG 17. The main body 37 of the hook can be of parallel or looped wire strands defining an inner edge 38. In plan, particularly as shown in FIG. 4, each hook is, when relaxed, approximately C-shaped and has a base 39 secured to the inside of a related arm 24 by a fastening 41. The hook 36 extends out or cantilevers from the mounting 41 and terminates in a curved or curled-in end 42 or terminal portion. The hook proceeds through a relatively long slot 44 in the arm (FIG. 8) and is also able to pass through a mating slot 46 in the guard 32.

All of the arms and guards are provided substantially as described. When the carriage is brought alongside an orange tree and the beam 18 is moved in toward the tree, the effect is to plunge the various guards into the tree past the limbs and fruit thereof until the leading points 34 approach the central plane of the tree.

At that time the cylinder 28 is energized to move the arms 24 outwardly with respect to the guards so that the normally stowed hooks are projected. That is, the parts move from a position substantially as shown in FIG. 9 into another position substantially as shown in FIG. 10. The originally separated plates 22 and 26 are moved into close juxtaposition with each other. This motion of the parts causes each hook terminal 42 to emerge from its stowed position within the slots 44 and 46, substantially as shown in FIG. 7, and to project through the position shown in FIG. 8 into the fully projected position shown in FIG. 4, for example.

The projection of the hooks occurs while the guards and arms are well within the structure of the tree. At that time the beam 18 is withdrawn. The two closely approached plates 22 and 26 are moved out of or away from the tree simultaneously. The arms and guards are correspondingly removed.

During the outward, removal motion the hooks 36, as shown particularly in FIGS. 11a and 11b, brush by or are slightly uncoiled and then recoil if they encounter a relatively stiff branch such as 51. This does no harm to the tree and has no effect upon the hook. In moving out of the tree from the inside towards the exterior thereof, as shown in FIGS. 14a and 14b as well as FIGS. 15a and 15b, the hook, having its predetermined C-shape contour, might encounter a relatively small, light and, therefore, supposedly immature fruit 53. The hook continues on its path without picking the unwanted orange since the fruit is of a size to pass through the loop of the hook and to ride over the top of the hook without damage and to come to rest. An exemplary tension on the hook might be 10 pounds and this may produce momentary, partial uncoiling of the hook. The fruit escapes without being severed or picked.

Should the hook encounter a relatively mature fruit 56, as shown in FIGS. 12a, 12b, 13a and 13b, then the mass of the fruit and its size are too great for the fruit to pass through the C-shaped loop of the hook. Rather, the fruit tends to stay in position. The outwardly moving hook, although it may uncoil somewhat under an exemplary tension of 20 pounds, nevertheless brings its inner edge against the fruit and detaches it. The fruit is thus removed from the tree or picked. The detached fruit falls by gravity and is received in a catching frame 57 on the carriage 6.

If desired, the hook may have a sharp inner edge so as to sever the fruit stem. After the fruit is detached, the hook by inherent resiliency recoils to its original C-shape and is effective to engage with another fruit as it travels outwardly of the tree so that the same hook may pick several oranges for one outward trip.

After one operation has been completed, the carriage is moved or the support 16 is turned and the arms and guards are again plunged into the tree with the hooks retracted. Subsequently the hooks are expelled by relative movement of the arms and guards. Then the assembled arms and guards are moved bodily out of the tree so that the hooks again rake across and, where appropriate, detach the fruit from the tree and in that fashion harvest the fruit.

The above operation is with or without sharpened hook edges and with or without cutting of the fruit stems. It is also possible to provide a hook 61 (FIG. 18) at its outward extremity 62 having a knife case 63 in which a knife 64 is freely pivoted. The knife can easily retract into the case against a light leaf spring 66 unless a latch 67 is depressed by contact with a large orange. The knife is then held against retraction and engages the stem of the orange. Upon such engagement the knife severs the orange stem. During return movement the knife 64 can fold into the case 63 against the urgency of the spring 66 if it encounters an obstacle. Following this the knife springs out to a position for latching to effect another severing operation.

As an alternate, the arm 24 has a mounting 68 (FIG. 6) to which a special hook 69 is pivotally secured by a pin 71. The hook is substantially the same as previously described except that it is rigid and has a bell-crank end 72 with which a spring 73 is engaged, the other end of the spring being engaged with an anchor 74 on the arm 24.

The conduct of the picking operation is relatively free from difficulty since the hooks last for quite a while but can easily be replaced or resharpened when necessary. The mechanism is relatively simple and the operation is quite straightforward. The hooks perform a selecting operation so that small, immature fruit are not picked but the larger, mature fruit are detached for recovery. There is no mutual damage if the hooks do happen to encounter branches or limbs of the tree.

Many times the abscission layer between the orange and its stem is sufficiently weak so that the hook need not be sharpened but can simply pull the orange from its stem to effectuate the picking operation.

I claim:

1. An orange picker comprising a frame plate; a hollow, elongated arm; means for supporting said arm at one end to project from said frame plate, said arm having a first, longitudinally extending slot therein; a flexible, elastic, substantially C-shaped hook having a main body with a base portion and a curled, free terminal portion; means mounting said base portion within said arm adjacent the end of said slot near said one end and with said free terminal portion extending into said first slot; an elongated guard encasing at least part of said arm, said guard having a mating slot therein adapted to pass said main body; and means for moving said guard along said arm between one position with said mating slot passing only said terminal portion and a second position with substantially all of said body extending through said mating slot with said terminal end free and spaced from said guard and directed toward said one end.

2. A device as in claim 1 in which said mounting means fixes said base portion on said arm and said urging means is a springy portion of said hook.

3. A device as in claim 1 in which said hook has a cutting edge.

4. A device as in claim 2 in which said hook when unstressed is substantially C-shaped.

5. A device as in claim 1 in which said hook has a curvature with a diameter smaller than that of large oranges to be picked and larger than that of small oranges to be picked.

6. A device as in claim 1 in which said resiliently urging means is sufficient to retain a predetermined shape of said hook when said hook encounters an orange to be picked and is insufficient to retain said predetermined shape of said hook when said hook encounters an orange tree limb.

* * * * *